Nov. 22, 1966     W. C. EBERLINE     3,286,871
FUEL TANK AND MOUNT
Filed June 26, 1964     2 Sheets-Sheet 1
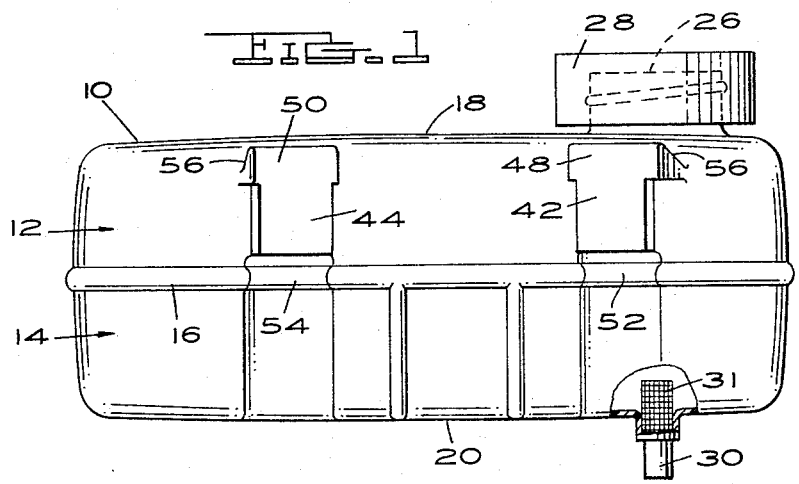
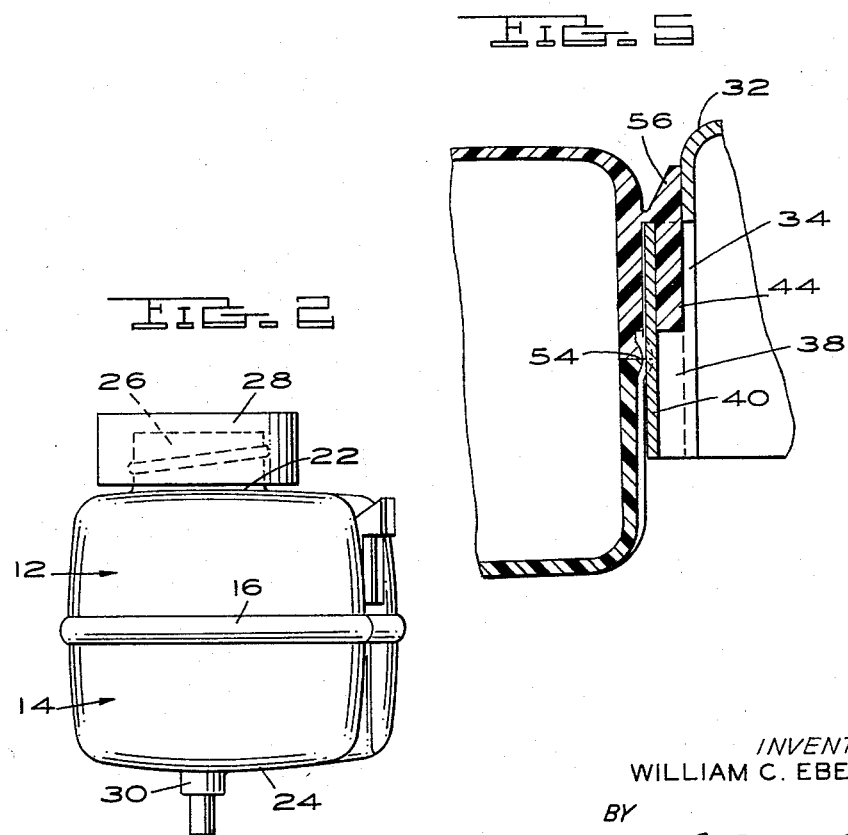
INVENTOR
WILLIAM C. EBERLINE
BY
Barnes, Kisselle, Raisch & Choate
ATTORNEYS Nov. 22, 1966 W. C. EBERLINE 3,286,871
FUEL TANK AND MOUNT
Filed June 26, 1964 2 Sheets-Sheet 2

INVENTOR
WILLIAM C. EBERLINE
BY
Barnes, Kisselle, Raisch & Choate
ATTORNEYS

United States Patent Office 3,286,871
Patented Nov. 22, 1966

3,286,871
FUEL TANK AND MOUNT
William C. Eberline, Cass City, Mich., assignor to Walbro Corporation, Cass City, Mich., a corporation of Michigan
Filed June 26, 1964, Ser. No. 378,283
4 Claims. (Cl. 220—5)

This invention relates to a fuel tank construction and particularly to that type of fuel tank which is used on portable power units such as power lawn mowers, chain saws, go-carts and the like.

It is an object of the present invention to provide a gas tank of plastic material which is easily mounted to an engine housing in a way in which it cannot be readily dislodged and also in a way in which it is not subject to vibratory fatigue.

It is a further object to provide a gas tank construction which has inherent rigidity which gives it suitable strength to withstand vibration while retaining the quantities of fuel required to be held in it and which is so designed that it can be quickly applied and locked in place.

A further object is the provision of a gas tank construction wherein the mounting means is suitably shielded to improve the appearance of the tank in the general assembly.

A further object is the provision of a molded plastic gas tank which is heat sealed in a joint which reinforces the entire construction.

Other objects and features of the invention relating to details of construction and operation will be apparent in the following description and claims.

Drawings accompany the disclosure and the various views thereof may be briefly described as:

FIGURE 1, a side elevation of a tank constructed in accordance with the present invention.

FIGURE 2, an end elevation of the tank.

Figure 3:
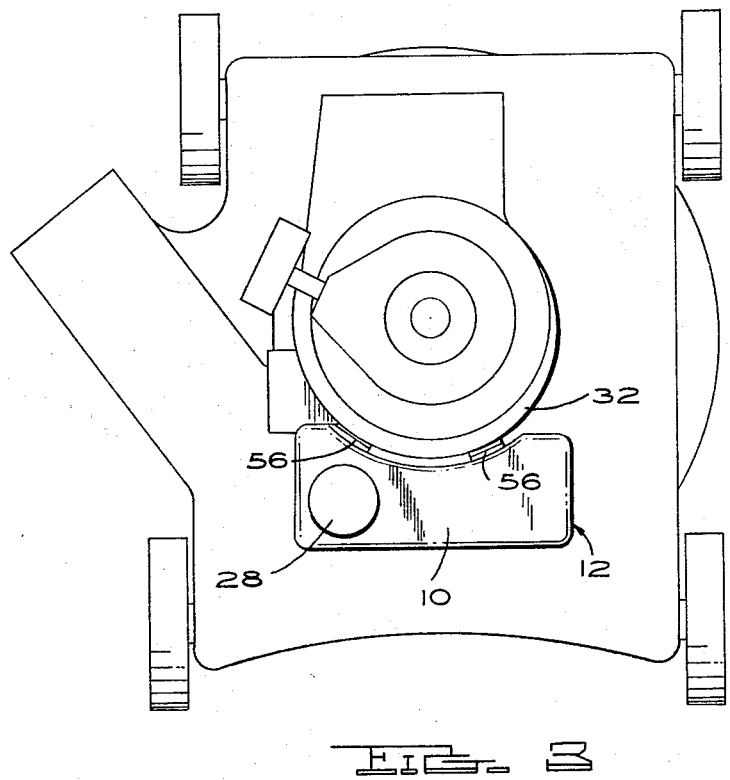

FIGURE 3, a top view of a tank mounted on a mower.

Figure 4:
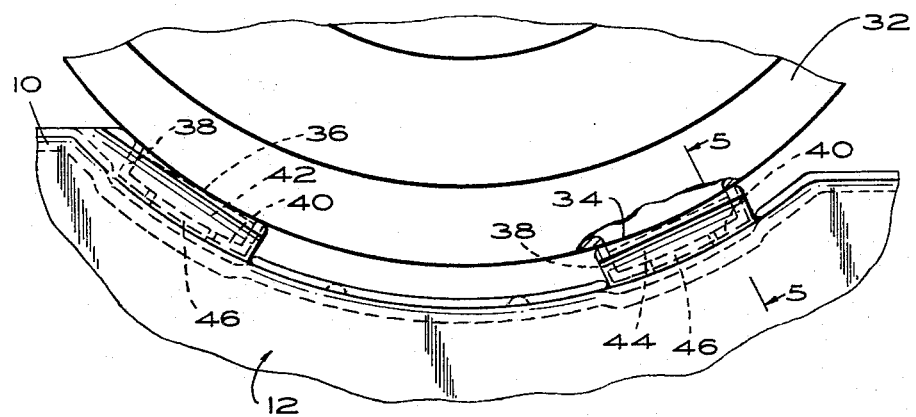

FIGURE 4, an enlarged view of the mounting connection.

FIGURE 5, a sectional view taken on line 5—5 of FIGURE 4.

Referring to the drawings:

In FIGURE 1, the tank is shown made of molded plastic material having resistance to hydrocarbons, such as gasoline. The tank 10 is composed of two half portions 12 and 14 which are butt welded together to form a protruding seam rib 16 which extends around the entire girth of the tank. Each wall of the tank is designed to have a crowned configuration, that is, a slight curve in each lineal dimension, the high point of the crown longitudinally being at 18 on the top section 12 and at 20 on the bottom section. In cross section, the crown surface is evident at 22 and 24 on the respective sections 12 and 14. The top section has a neck portion 26 with a suitable screw thread on the outer surface for receiving a gas cap 28. The bottom section 14 has an outlet tube 30 which, if desired, can be provided with a suitable filter strainer 31 heat sealed in place before the sections are welded together.

In order to get sufficient rigidity into these plastic parts to resist vibration and oil-canning effect caused by changes of temperature and pressure and the violant vibration and bumping to which these tanks are subject, it has been necessary in the past to provide internal ribbing reinforcement for the walls. However, it has been found that with the crowning effect above described in the walls, together with the central rib formed by the butt welding operation, that the tank has adequate strengh to resist the forces acting on it.

Another problem in the use of these plastic tanks is the mounting of the tanks in a way to have an attractive appearing unit firmly fastened to the housing which serves as a support. In the instance shown, the support is a cowl housing 32 which can serve as the fly wheel, windvane housing and this housing has, on a side wall, spaced slots 34 and 36, the edges of which are turned outward and toward each other to provide opposed bracket members 38 and 40 which form a re-entrant recess adjacent to vertical walls of the cowl. Formed to co-operate with these re-entrant recesses are T-shaped lugs 42 and 44 which are joined to the rear wall of the top portion 12 of the tank by a wide, thin neck portion 46. The top of the lugs 42 and 44 is wider at 48 and 50 so that the ends of the top portions extend beyond the lugs on each side for purposes which will be later described. The neck 46 is of such a thickness that the edges of the lugs 42–44 fit snugly between the wall of the tank and the inside of the lug, the dimensioning being such that the plastic, which is resilient, is slightly distorted or flexed as the parts are moved into place.

As shown in FIGURE 4, the rear wall of the top shell 12 is recessed at the point where the lugs 42 and 44 are formed so that a portion 52 and 54 of the seam rib 16, which is preferably continuous, is recessed to the degree that it will not interfere with the movement of the tank into the suspending lugs as above described. This is shown particularly in FIGURE 5.

As viewed in FIGURE 4, it will be seen that the lug portions 42 and 44 slip down into the recess formed by the opposed brackets 38 and 40 and are locked into these brackets, the neck portions 46 slipping down between the opposed portions of the brackets and the recessed portions 52 and 54 of the reinforcing seam rib 16 being positioned to clear the bracket elements. Thus, the rear wall of the top shell 12 is securely fastened to the cowl wall 32.

In order to cover the bracket portions, the lugs 42 have been shaped as shown in FIGURE 1 in the wider top portions 48 and 50 to extend over the bracket portions as shown in FIGURE 4. The top portions of these lugs have also been tapered at 56 from the supporting wall of the tank so that they blend in against the wall of the cowl 32 and provide a finished appearance for the mounting means. These extending portions also form a stop for the bracket portions so that the tank seats down securely, the lugs and the brackets being dimensioned for a snug friction-type fit.

It will thus be seen that there is provided a solid reinforced tank having walls which will not "oil-can" with the vibration to which they are subjected and having a reinforcing rib extending continuously around the girth. In addition, the entire assembly can be attractively and securely mounted on an engine in a manner in which the securing means is entirely hidden.

I claim:
1. A fuel tank and mount comprising:
   (a) a tank formed of molded plastic parts each forming a top and a bottom respectively, these parts being butt welded together at the matching edges to form a reinforcing rib seam around the girth of the tank, said tank having walls which are each crowned in two directions to add rigidity to the tank and prevent vibration of the walls, and
   (b) means to mount said tank comprising spaced brackets having facing edges forming re-entrant recesses and lugs on one wall of said tank having a portion to enter into said recesses behind said facing edges of said brackets, and
   (c) means on the top of said lugs extending to the wall of said tank to overlie and shield said brackets and to form a stop in the mounting motion of said tank into said brackets.
2. A fuel tank as defined in claim 1 in which the means on the top of said lugs extends to each side of said lugs and has a top surface which tapers toward said tank to blend in with the wall of said tank on which said lugs are mounted.

3. A fuel tank as defined in claim 1 in which said brackets are mounted on a substantially vertical mounting wall and in which the means on the top of said lugs extends to each side of said lugs and has a top surface which tapers from the mounting wall of said tank to the wall on which said brackets are mounted to blend in with the wall of said tank and the wall on which said brackets are mounted.

4. A device as defined in claim 1 in which the reinforcing seam rib on the mounting wall of said tank is recessed into the tank below said lugs to prevent mechanical interference with the mounting motion of said tank.

References Cited by the Examiner

UNITED STATES PATENTS

| | | | |
|---|---|---|---|
| 1,976,622 | 10/1934 | McIntyre | 220—5 |
| 2,427,335 | 9/1947 | Antonia et al. | |
| 2,806,622 | 9/1957 | Leirer | 220—5 |
| 2,990,082 | 6/1961 | Boysen. | |
| 3,142,422 | 7/1964 | Mojonnier | 150—.5 X |
| 3,190,500 | 6/1965 | Miles. | |

THERON E. CONDON, *Primary Examiner.*